Aug. 9, 1932.  A. N. MERLE  1,871,335
STOPPING DEVICE FOR CINEMATOGRAPHIC APPARATUS
Filed Nov. 28, 1930   3 Sheets-Sheet 1

ANDRÉ NOËL MERLE
INVENTOR;
By Otto Munk
his Attorney.

Aug. 9, 1932.  A. N. MERLE  1,871,335
STOPPING DEVICE FOR CINEMATOGRAPHIC APPARATUS
Filed Nov. 28, 1930  3 Sheets-Sheet 2
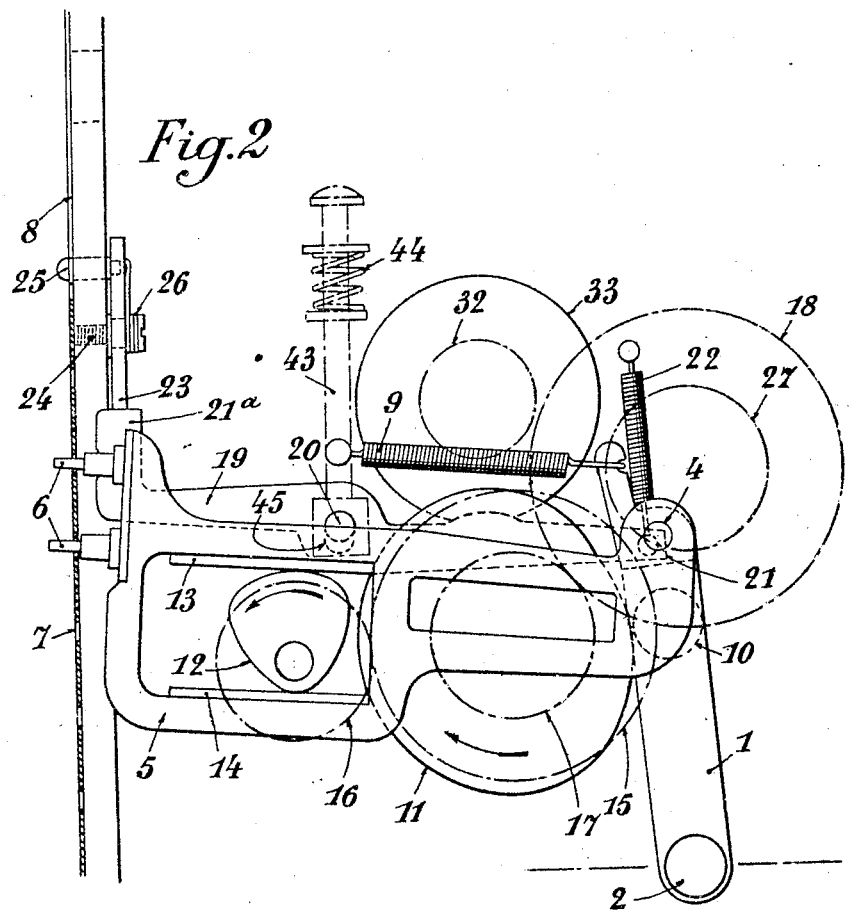
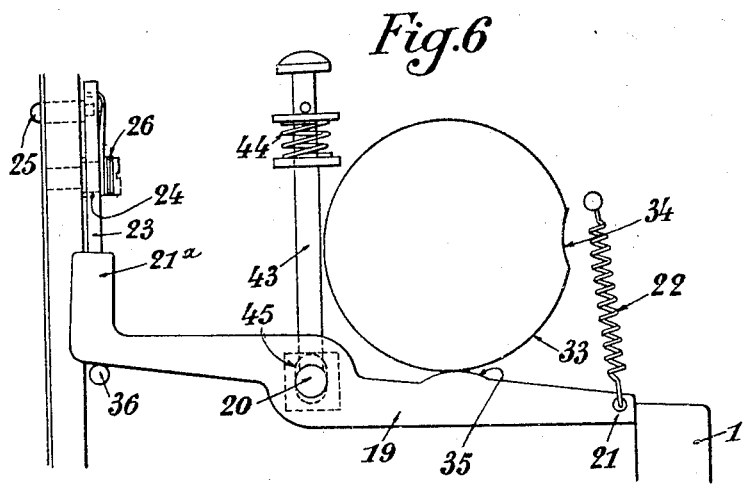
ANDRÉ NOËL MERLE
INVENTOR;
By Otto Munk
his Attorney.

Aug. 9, 1932.  A. N. MERLE  1,871,335

STOPPING DEVICE FOR CINEMATOGRAPHIC APPARATUS

Filed Nov. 28, 1930  3 Sheets-Sheet 3

ANDRÉ NOËL MERLE
INVENTOR

By Otto Munk
his Attorney.

Patented Aug. 9, 1932

1,871,335

UNITED STATES PATENT OFFICE

ANDRÉ NOËL MERLE, OF VINCENNES, FRANCE, ASSIGNOR TO PATHE CINEMA, ANCIENS ETABLISSEMENTS PATHE FRERES, OF PARIS, FRANCE

STOPPING DEVICE FOR CINEMATOGRAPHIC APPARATUS

Application filed November 28, 1930, Serial No. 498,530, and in France January 23, 1930.

This invention relates to devices for automatically stopping during a determined period the feeding of the film in cinematographic apparatus, of the type in which a controlling finger is placed in contact with the edge or other portion of the film and controls the position of the feeding members by which the claws are inserted into and removed from the film perforations.

According to the present invention, the finger in contact with the film acts to normally hold a stop arm at a distance from the lever controlling the insertion of the claws and the said stop arm is brought into the path of the said lever by means of a rotatable cam.

According to another feature of the invention, a heat-protecting shutter or screen rotatively mounted adjacent the film gate of the apparatus, is positively controlled by the shaft driving the said rotatable cam. In this manner, said screen will come between the source of light and the film when the latter is stopped upon a title or image, whereby the effect of the heat of the light beam upon the film will be diminished.

To these two devices is added suitable means for manual control by which the film mechanism can be uncoupled by the operator at any time during the travel of the film.

The accompanying drawings show by way of example an embodiment of the invention.

Fig. 2 is an elevation view of the film-operating mechanism in the coupled or operative position.

Fig. 6 is an elevation view of the same.

Figure 1:
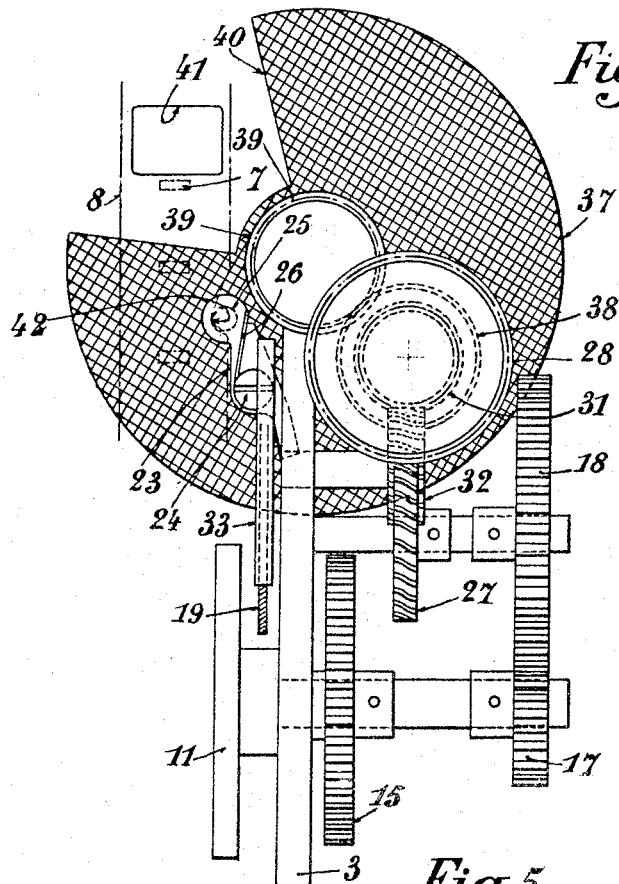
Fig. 1 is a front end view of the improved devices.
Figure 5:
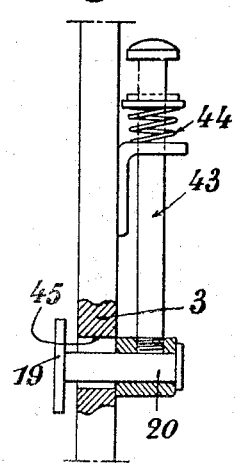
Fig. 5 is a side view of the device for the manual control of the uncoupling.

The film-feeding device comprises a lever 1, pivotally mounted on a stationary axle 2 disposed on a supporting plate 3 (Fig. 2). To the said lever 1, is pivoted at 4 a carriage 5 provided with claws 6, which may be engaged with or released from the perforations 7 of the film 8. A spring 9 urges a roller 10—mounted on the lever 1—against a rotatable cam 11, whereby the lever 1 is oscillated about its axle 2 and the claws are inserted into the film or removed. A triangular cam 12 acts upon the horizontal walls 13—14 of an opening in the said carriage 5, for feeding the film. The cams 11—12 are respectively secured to the gear wheels 15—16, which latter are in gear engagement. The diameter of the wheel 15 is preferably a multiple of the diameter of the wheel 16, for instance double this diameter. On the shaft of the gear wheel 15 is mounted a gear wheel 17 engaging the driving pinion 18 (Fig. 1), which can be manually or mechanically actuated.

Figure 3:
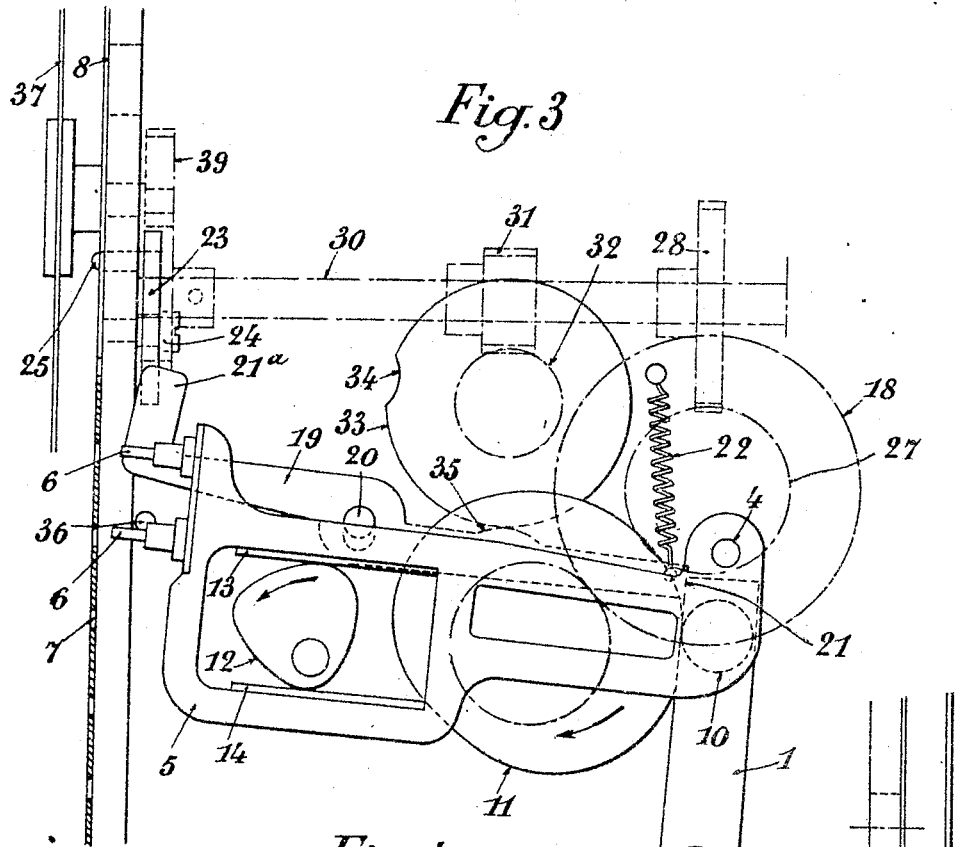
Fig. 3 is a front elevation view of the film mechanism in the inoperative position, and of the means controlling the shutter.
Figure 4:
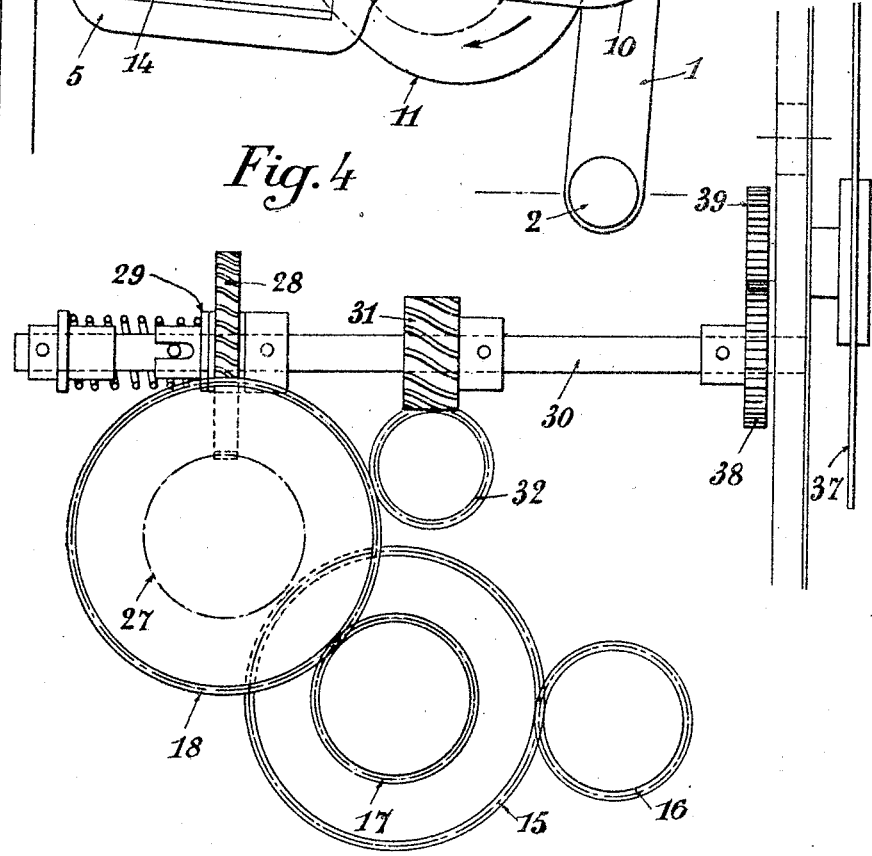
Fig. 4 is an elevation view of the other side of the device, showing the friction arrangement controlling the coupling and the shutter.

On the stud shaft 20, is mounted a stop arm 19, which may turn in such manner that its end 21 will be brought into the path of the lever 1, as shown in Figure 3, or will be removed therefrom, as shown in Figure 2. A spring 22 attached to the said end 21 urges this end 21 out of the path of the lever 1. Adjacent the other end 21ª of the said arm 19, is disposed a catch or controlling finger 23, which is pivoted to an axle 24 and is urged by a spring 26, so as to press a contact stud 25 carried by said finger against the edge of the film 8. In normal conditions, the said finger will thus maintain the stop arm 19 in the released position, as shown in Figure 2 and as explained later on.

On the shaft of the wheel 18 is keyed a worm 27 engaging a worm wheel 28, which is coupled, by a friction device 29, to the shaft 30, and thus if a sufficient resistance acts against the rotation of the shaft 30, this latter will be held fast, whilst the wheels 18—17—15—16—27—28 continue to rotate. On the shaft 30 is secured a worm 31 engaging a worm wheel 32 on whose shaft is mounted a cam 33, in which is formed a notch 34 normally engaged with a boss 35 provided on the said stop arm 19 under the action of the spring 22, during the travel of the film; the tension of the said spring is such that its effect is less than that of the friction device 29.

A fixed stop 36 serves to limit the descent of the end 21ª of the arm 19.

The shaft 30 drives by means of the gear wheels 38—39 a rotary screen 37 consisting of a disk of suitable material adapted to reduce the action of the heat of the source of light upon the film. The said disk may consist of wire gauze, as shown in the drawings, but it might be made of a special glass or of similar material. In the said screen or obturator is an aperture 40 in coincidence with the gate aperture 41 of the apparatus when in the idle position, that is, when the cam 33 is held by the boss 35 and by the controlling finger 23.

The operation is as follows:

Normally, the stop-arm 19 is in the position shown in Fig. 2, i. e. clear from the operating lever 1 of the feeding mechanism and the latter oscillates under the action of the cam 11 and spring 9, so as to actuate the slide 5 and feed the film. In such position, the left end 21ª of the arm 19 is prevented from rising by the controlling finger 23, and the boss 35 on the stop arm 19 engages in the notch 34 of the cam 33, under the action of spring 22, and prevents said cam from rotating, the friction coupling 29 acting to allow the wheel 28 to rotate under the action of the driving wheel 18. The screen 37 is thus stationary in the position shown in Fig. 1.

When a notch 42 in the film 8, which is fed by the claws 6, comes opposite the contact stud 25, the controlling finger 23, urged by the spring 26, pivots on the axle 24 (Figs. 1 and 2), and the end 21ª of the stop arm 19 is thus free to move upwardly. The cam 33 which constantly tends to rotate can thus begin to do so, the notch 34 in the same leaves the boss 35 of the arm 19 and the periphery of the cam acts to depress the right hand end 21 of the arm 19 in opposition to the spring 22, said motion of the arm 19 being permitted by the fact that its left end 21ª is now free to rise, the right end 21 of the arm 19 thus brought into the path of the operating lever 1, which is thus held in position and can no longer oscillate under the action of the cam 11 and spring 9. In this manner, the claws 6 will be held out of the film, and will not move the film during one revolution of the cam 33. During this rotation of the cam 33, the shaft 30 actuates at the same speed the screen 37, which comes between the film and the source of light during the whole revolution of the cam. When the said cam 33 has made a complete revolution, the boss 35 again enters the notch 34 under the action of the spring 22, so that the right end 21 of the arm 19 is raised. The lever 1 is thus released, which allows the claws to again enter the perforations of the film and to feed the latter. The film drives back the stud 25, thus pivoting the finger 23, which again holds the stop arm 19 in the film feeding position. The screen 37 which is positively connected with the cam 33 will of course stop in a position such that its aperture 40 coincides with the gate opening 41, and the friction coupling now commences again to slide.

The time during which the film is stopped depends upon the speed of rotation of the cam 33, and this speed depends in turn upon the diameters of the gearing used.

The whole arrangement may be completed by a manual releasing means under the operator's control, and for this purpose, a pressing button device 43, upwardly urged by a spring 44, is secured to the pivoting axle 20 of the stop arm 19; said axle is movable in a slot 45 in the supporting plate 3 of the apparatus. When the operator desires to stop the film at any point, he presses down the said button device 43, and thus lowers the axle 20. During this movement, the arm 19 takes its fulcrum upon the stop 36. The end 21 of the arm 19 again comes into the path of the lever 1, and the cam 33 which is now released will rotate under the action of the friction device 29, as in the case of the automatic device. When the said cam has made a complete revolution, the arm 19, under the combined action of the springs 22 and 44, resumes its original position, and if the pressure upon the button device 43 has ceased, this will release the claws, and the boss 35 will now hold the cam 33. The spring 44 is so calculated that its action on the said arm 19 exceeds the effect of the friction device 29; it has sufficient force to urge the boss 35 into the notch 34, thus holding the cam 33 and with it the said mechanism.

The pressing button 43 is preferably held when at the bottom of its stroke by a locking device of any desired construction, thus allowing the operator to stop the film upon an image as long as he desires. It is to be noted that during the whole time of the stoppage, whether this is effected automatically by the notches provided in the film or by the direct action of the button 43, the screen 37 will cut off the greater part of the heat, thus obviating one cause of destruction of the film.

Obviously, the devices for making idle the film feeding mechanism and for driving the screen, as herein described, can be employed with feeding mechanisms of various constructions.

The device hereinabove described is susceptible of any desired modifications without departing from the principle of the invention.

Having now described my invention, what I claim as new and desire to secure by Letters Patent is:

1. In a cinematographic apparatus, a film gate for the film, a claw-carrying device adapted to be moved towards and away from said film gate, means for moving said claw-carrying device towards and away from said film gate, a pivoted stop arm adapted to be brought into and out of a position in which said stop arm maintains said claw-carrying device in an inoperative position, a rotatable cam, elastic means adapted to urge said stop arm towards said cam and to cooperate with said cam for bringing said stop arm into and out of the position in which said claw-carrying device is held in the inoperative position, means for rotating said cam, a movable contact member adapted to bear on the edge of the film, a locking member connected with said contact member and adapted, when said contact member bears on the normal edge of the film, to hold said stop arm out of the position in which said claw-carrying device is held in the inoperative position, and a friction device inserted between said cam and said means for rotating said cam and adapted to yield when said movable contact member bears on the normal edge of the film.

2. In a cinematographic apparatus, a film gate for the film, a claw-carrying device adapted to be moved towards and away from said film gate, means for moving said claw-carrying device towards and away from said film gate, a pivoted stop arm adapted to be brought into and out of a position in which said stop arm maintains said claw-carrying device in an inoperative position, a rotatable cam provided with a notch at its periphery, elastic means adapted to urge said stop arm towards said cam and to cooperate with said cam for bringing said stop arm into and out of the position in which said claw-carrying device is held in the inoperative position, means for rotating said cam, a projecting member on said stop arm adapted to be engaged in said notch, a movable contact member adapted to bear on the edge of the film, a locking member connected with said contact member and adapted, when said contact member bears on the normal edge of the film, to hold said stop arm out of the position in which said claw-carrying device is held in the inoperative position, and a friction device inserted between said cam and said means for rotating said cam and adapted to yield when said movable contact member bears on the normal edge of the film.

3. In a cinematographic apparatus, a film gate for the film, a claw-carrying device adapted to be moved towards and away from said film gate, means for moving said claw-carrying device towards and away from said film gate, a hand operated lever adapted to assume two extreme positions, a pivot carried on said lever, a stop arm pivoted on said pivot, a rotatable cam, elastic means adapted to urge said stop arm towards said cam and to cooperate with said cam for bringing said stop arm into and out of a position in which said claw-carrying device is held in the inoperative position, means for rotating said cam, a movable contact member adapted to bear on the edge of the film, a locking member connected with said contact member and adapted, when said contact member bears on the normal edge of the film, to bear on one side of said stop arm, so as to hold said stop arm against rotation by said cam, an abutment for said stop arm on the other side of said stop arm and adapted to serve as a pivot for said stop arm when said hand operated lever is displaced, and a friction device inserted between said cam and said means for rotating said cam and adapted to yield when said movable contact member bears on the normal edge of the film.

4. In a cinematographic apparatus, a film gate for the film, a claw-carrying device adapted to be moved towards and away from said film gate, means for moving said claw-carrying device towards and away from said film gate, a pivoted stop arm adapted to be brought into and out of a position in which said stop arm maintains said claw-carrying device in an inoperative position, a rotatable cam, elastic means adapted to urge said stop arm towards said cam and to cooperate with said cam for bringing said stop arm into and out of the position in which said claw-carrying device is held in the inoperative position, a rotatable screen provided with a segmental cut out portion, means adapted to connect operatively said cam and said screen, power means adapted to transmit motion to said connecting means between said cam and said screen and hence also to said cam and screen, a movable contact member adapted to bear on the edge of the film, a locking member connected with said contact member and adapted, when said contact member bears on the normal edge of the film, to hold said stop arm out of the position in which said claw-carrying device is held in the inoperative position, and a friction device inserted between said power means and said connecting means between said cam and said screen and adapted to yield when said movable contact member bears on the normal edge of the film.

In testimony whereof I have signed my name to this specification.

ANDRÉ NOËL MERLE.